US009921922B2

(12) United States Patent
Dunn et al.

(10) Patent No.: US 9,921,922 B2
(45) Date of Patent: Mar. 20, 2018

(54) SYSTEM, METHOD AND COMPUTER PROGRAM PRODUCT FOR CONTACT INFORMATION BACKUP AND RECOVERY

(71) Applicant: GLOBALLY TELE-CONNECTED, LLC, Dallas, TX (US)

(72) Inventors: John Dunn, Dallas, TX (US); Craig H DePoi, Metairie, LA (US)

(73) Assignee: Globally Tele-Connected, LLC, Dallas, TX (US)

( * ) Notice: Subject to any disclaimer, the term of this patent is extended or adjusted under 35 U.S.C. 154(b) by 66 days.

(21) Appl. No.: 14/941,869

(22) Filed: Nov. 16, 2015

(65) Prior Publication Data

US 2016/0139998 A1    May 19, 2016

Related U.S. Application Data

(60) Provisional application No. 62/081,168, filed on Nov. 18, 2014.

(51) Int. Cl.
*G06F 11/14* (2006.01)
*G06F 3/0482* (2013.01)

(52) U.S. Cl.
CPC ........ *G06F 11/1464* (2013.01); *G06F 3/0482* (2013.01); *G06F 11/1451* (2013.01); *G06F 11/1469* (2013.01)

(58) Field of Classification Search
CPC .......................... G06F 11/1451; G06F 11/1461
USPC ......................................................... 707/758
See application file for complete search history.

(56) References Cited

U.S. PATENT DOCUMENTS

| 8,984,592 | B1* | 3/2015 | Paczkowski | .......... H04W 12/08 726/26 |
| 2003/0009439 | A1* | 1/2003 | Lee | ..................... G06F 17/3089 |
| 2007/0026852 | A1 | 2/2007 | Logan et al. | |
| 2008/0034011 | A1 | 2/2008 | Cisler et al. | |
| 2011/0047033 | A1* | 2/2011 | Mahaffey | ........... G06Q 30/0269 705/14.66 |

(Continued)

OTHER PUBLICATIONS

Notification of Transmittal of the fiInternational Search Report and the Written Opinion of the International Searching Authority, PCT/US15/60896, dated Mar. 4, 2016, p. 1-16.

*Primary Examiner* — Syling Yen
(74) *Attorney, Agent, or Firm* — Braxton, Hilton & Perrone, PLLC

(57) ABSTRACT

A method for contact information backup and recovery comprising receiving, by a contact information backup and recovery system, subscriber information, storing the subscriber information in a contacts data store, receiving, by the contact information backup and recovery system, contacts information associated with the subscriber information, storing the contacts information in the contacts data store, wherein the contacts information is stored in relation to the subscriber information, receiving, by the contact information backup and recovery system, a contacts recovery request, and performing, by the contact information backup and recovery system, a contacts recovery operation, comprising acquiring target contact information from the stored contacts information in the contacts data store, performing a telephonic communication using the target contact information, and sending the stored contacts information to a remote storage device.

4 Claims, 5 Drawing Sheets

(56) References Cited

U.S. PATENT DOCUMENTS

2011/0078501 A1* 3/2011 Koch .................. H04W 28/14
                                                    714/15
2012/0239822 A1   9/2012 Poulson et al.
2014/0006354 A1   1/2014 Parkison et al.
2014/0046903 A1   2/2014 Yin

* cited by examiner

SYSTEM, METHOD AND COMPUTER PROGRAM PRODUCT FOR CONTACT INFORMATION BACKUP AND RECOVERY

This application is claims priority to U.S. Provisional Patent Application No. 62/081,168, filed Nov. 18, 2014.

TECHNICAL FIELD

This invention relates generally to the field of data recovery. More particularly, this invention relates to a system, method, and computer program product for contact information backup and recovery.

BACKGROUND

As technologies continue to advance in cellular phones, mobile handheld devices have become a useful tool to some people and a necessity to others. Some cellular phones have the computational power and storage capacity that is on par with laptop computers. The operating systems running on these mobile communication devices likewise have become quite sophisticated, capable of handling many functions that are typical of a standard personal computer (PC). Such powerful mobile communication devices are often referred to as "smartphones."

Around the globe, people have come to rely on smartphones. This reliance often raises many issues. For example, today's smartphones make it very easy for a user to initiate a call to another person whose number is stored in the user's contact list without having to memorize the other person's phone number(s). If a user's mobile communication device is lost, stolen, shattered, dropped in water, has a dead battery, or suffers from a serious technical issue or mishap, the user may have no access to their contact list (also referred to herein as "contacts") as the contact list may become lost and not be recoverable unless a backup of the contact list was stored elsewhere. This is problematic as most smartphone users rely on the contact identifier or other shortcut made available through the devices, rather than actual memorization of the contact's number or other information. Currently, there is no extremely simple and convenient or timely way for one to store and retrieve one's contacts outside of the user's mobile communication device. Additionally, even if the user were able to recover his or her contact list, for instance, by purchasing another mobile communication device or smartphone and then syncing the new smartphone with a backup stored on a personal computer or other backup device, this is not a timely, simple or convenient solution for most users. In some cases, the lack of a simple and timely solution can be extremely problematic, particularly when the user has an urgent need to call someone (e.g., a loved one, baby sitter, colleague, etc.), but does not remember that person's phone number and is nowhere near the PC or other device where the user's backup contact list may be stored.

SUMMARY

Embodiments disclosed herein provide various solutions that address and resolve this problematic issue facing smartphone users worldwide. Smartphone users who have suffered a lost, broken, stolen, damaged, or dysfunctional cellular phone and, as a result, have lost all of the critical contact information stored on their phones and are unable to call their contacts. Through the various embodiments described herein a user may dial into a system disclosed herein via a number such as a toll-free number, using any phone of any type (e.g., a payphone, borrowed phone, voice over IP (VOIP) phone, wireless or wired) and acquire the desired phone number(s). In various embodiments, the system can initiate and connect a call to a phone number on behalf of a user when the user selects a phone number from the user's stored phone list and requests that a call to the selected number be made.

In some embodiments, a contact list information backup and recovery method can be implemented by a system having at least one processor and at least one non-transitory computer-readable medium configured to store instructions translatable by the at least one processor to cause the system to perform the method. In some embodiments, the method can be implemented by a computer program product having at least one non-transitory computer-readable medium configured to store instructions translatable by at least one processor to cause a system to perform the method.

BRIEF DESCRIPTION OF THE DRAWINGS

For a more complete understanding, reference is now made to the following description taken in conjunction with the accompanying Drawings in which.

DETAILED DESCRIPTION

Figure 1:
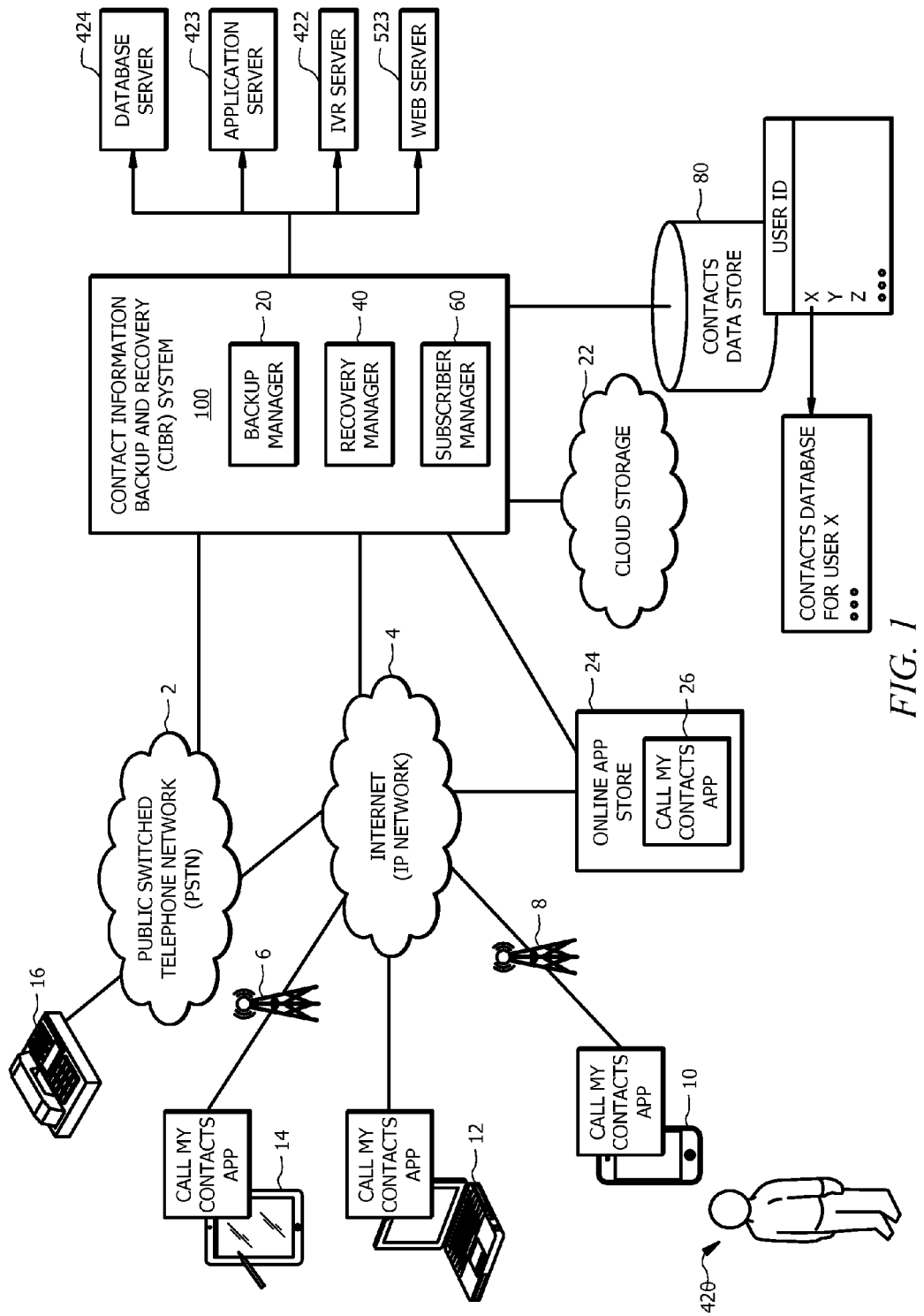
FIG. 1 illustrates a diagrammatic representation of a system embodiment configured to provide a mobile communication device with a contact information backup and recovery technique.

Referring now to the drawings, the various views and embodiments of a system, method and computer program product for contacts information backup and recovery are illustrated and described, and other possible embodiments are described.

Referring now to FIG. 1, there is illustrated a diagrammatic representation of a system embodiment that provides a means for storing and backing up a mobile communication device's contact list and for recovering one, some or all of the contact list at a later time. The Contact Information Backup and Recovery (CIBR) System 100 may operate on one or more server computers that are communicatively connected to various devices over wired/wireless network connections such as a publically switched telephone network (PSTN) 2, the internet 4, a WIFI network 6, a wireless communication system 8, a VOIP system or a variety of other communication or data networks. In one embodiment, system 100 comprises a plurality of modules including backup manager 20, recovery manager 40, and subscriber manager 60 in communication with a database server 424, application server 423, interactive voice response (IVR) server 422 and web server 523. Each module may be embodied on a non-transitory computer readable medium configured for performing its particular function or set of functions. For example, subscriber manager 60 may be configured for interfacing with a client-side application (e.g., "Call My Contacts App" shown in FIG. 1). That is, the subscriber manager may be configured to interact with a mobile communication device such as a mobile phone or smartphone 10, a personal computer or reasonable facsimile thereof 12, a personal digital assistant or electronic tablet 14, with the user able to interact via the client-side application residing thereon. In additional embodiments, the subscriber manager can be configured to interact with a land line phone 16 via PSTN system 2 when a user contacts the contact information backup and recovery system 100 via a predetermined phone number in order to retrieve contact information that was backed up from the user's smart phone and/or to initiate a phone call to the retrieved contact via the system 100.

The contact information backup and recovery system 100 can be connected to a cloud storage system 22 or another storage system 80 where backup contact lists from all the subscribing users are stored in a data base. Each subscriber is assigned a unique user ID such that all the contacts associated with each subscribing user are stored in association with the user ID.

Optionally, a user may be assigned login credentials such as a username, password or PIN or such credentials may be associated with the user's unique biometric features. Now referring to both FIG. 1 and FIG. 2, initial interactions 200 between a user's smartphone 10 and CIBR system 100 are explained. At step 202, a user, via their mobile communication device(s) 10, 12, 14 communicate via, for example the internet with an online application store 24 and download an embodiment of an CIBR related application 26 titled, for example "Call My Contacts App". In some embodiments, the CIBR related application is purchased prior to being downloaded by the user via remote purchasing techniques known in the art. At step 204, the user opens the CIBR related application 26 on the mobile communication device 10, 12, 14 and registers with the CIBR system 100 via the subscriber manager module 60 in order to become an active subscriber. The CIBR system will establish a user ID and password with the user. The user will also be provided information on how to upload and backup the user's contact list so that it is stored by the CIBR system 100 in at least one of the data storage locations 22, 80. The user will also be provided information on how to access the user's contact list from various electronic locations such as a non-registered mobile communication device or a phone connected to a land line. The user will also be informed how to make telephone calls to a selected contact from the stored contact list after access to the user's contact list is made.

Thus, on the server-side of the CIBR system 100, the subscriber manager 60 is configured to receive user related registration data, create a unique user identifier (ID) and password for the user/subscriber, and manage subscriber data associated with all the users/subscribers of the CIBR system 100.

The backup manager 20 of CIBR system 100 is seamlessly configured with the subscriber manager 60 to facilitate the uploading of a user's contact list at step 206 from the user's mobile communication device 10, 12, 14, communicate with a contacts data store 22, 80 or repository, store the user's uploaded contacts in a database (for instance, indexed to the user ID), and manage the stored user's contacts data. In some embodiments, the contacts data store 22, 80 may be implemented on a data storage device or server computer accessible locally or remotely by CIBR system 100. In some embodiments, contacts data store may be implemented using a secure cloud-based storage service 22 provided by a third party.

Figure 3:
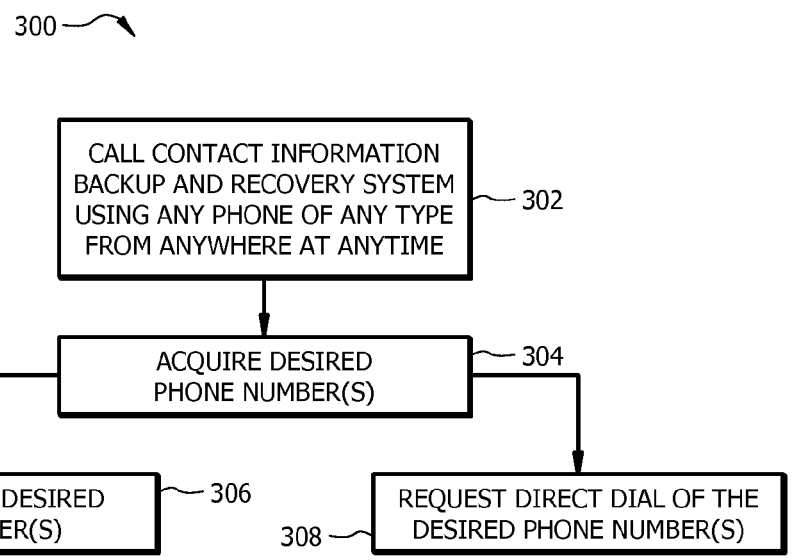
FIG. 3 illustrates a flow diagram depicting a contact recovery process in accordance with an embodiment.

Once the user's contacts have been uploaded from the user's mobile communication device and stored at step 206, subscribers can thereafter easily recover any or all of their contact information in the event of a lost, stolen, broken or dead mobile communication device 10 thereby providing the user/subscribers the benefit and ease of mind of knowing that they will always be able to call the CIBR system 100 from any phone, of any type, from anywhere and at any time, to acquire a desired phone number(s), and download the desired phone number(s) and/or request system 100 to directly dial the desired phone number(s), as illustrated in process 300 shown in FIG. 3.

FIG. 3 is a flow diagram depicting the steps taken for a subscriber to contact the CIBR system 100, select a contact or contact's phone number, and then request the CIBR system 100 to directly dial and connect the subscribing user to the desired contact phone number. At step 302 a user or subscriber, who has for example lost his phone, can call the CIBR system via another telephone, VOIP, an application downloaded on another's smart phone or via a designated webpage/website on the internet. The CIBR system can be contacted basically from any location in world were the user has access to a wireless or wired telephone, the internet or other internet or telecommunication device. The CIBR system can also be contacted at any time of the day or night, that is, 24 hours a day and 7 days a week.

At step 304 the user, via the communication system that the user is using, navigates the subscriber manager system to log into the CIBR system 100 and obtain access to the user's stored and/or backed up listing of contacts and related phone numbers. The user can then select a particular one or more of the user's contacts from the users stored contact list in step 304. Once one or more contacts are selected, the user at step 306 can have the one or more selected contacts downloaded to the electronic device that the user is using, provided the electronic device accepts such downloads. For example, if the user purchased or acquired a replacement or another smart phone, the user can either directly, or via a mobile telephone application, download one, a few, or all of the user's contacts that were previously stored in the CIBR system's memory 80. The user may request that the CIBR system provide the requested contact information audibly or send the information via email, text messaging, via messaging available on one or more other applications such as Facebook, Tumbler, WhatsApp, or any other derivations thereof. Alternatively, at step 308, the user can select to have the CIBR system via the recovery manager or backup manager dial the selected contact's phone number and connect the call to the publically switched phone system, internet VOIP system or wireless communication system so the user can speak to the selected contact. Alternatively, the user may request to leave a voice or text message for the selected contact. Alternatively, the user may request to leave a voice or text message for the selected contact. In one embodiment, the client-side application includes functionality that enables a user to initiate a call from a client-side device via a number of input devices. A user may initiate a contact recovery request via traditional entry of the retrieval number through a touch tone keypad of a landline or smart phone. Similarly, a call may be initiated via a voice activated or motion activated prompt according to known voice or motion activation sensing techniques. Also, a contact retrieval call may be initiated via entry of biometric indicia through an input device provided on the relevant initiating device.

In various embodiments, system 100 may be configured with a dedicated phone line such as a toll free number to receive calls from subscribers at no cost to the subscriber if they are using a PSTN or a wireless communication system to contact the CIBR system 100. Recovery manager 40 of system 100 may be configured to facilitate subscribers downloading some or all of their saved contacts directly into a new phone, as well as directly dial any of their contacts with the single push of a button on the phone from which they're calling.

Figure 2:
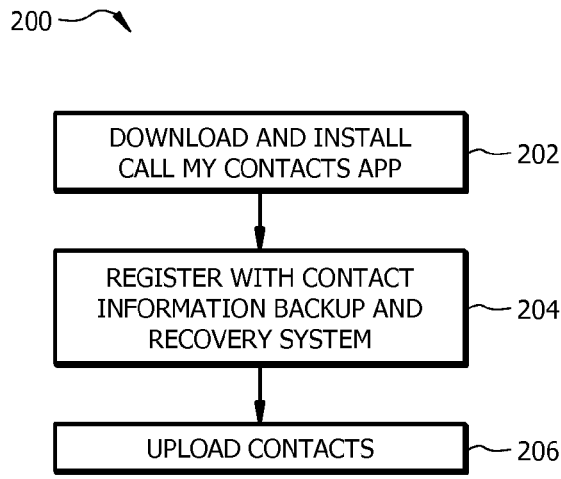
FIG. 2 illustrates a flow diagram illustrating an example user interaction with an embodiment system configured to provide a mobile communication device contact information backup and recovery technique.

In some embodiments, as illustrated in FIG. 2, system 100 may be configured to receive and dial analog and digital calls via public/private switched telephone network(s) and/or the internet or some other wireless/wired Internet Protocol (IP) network.

Figure 4:
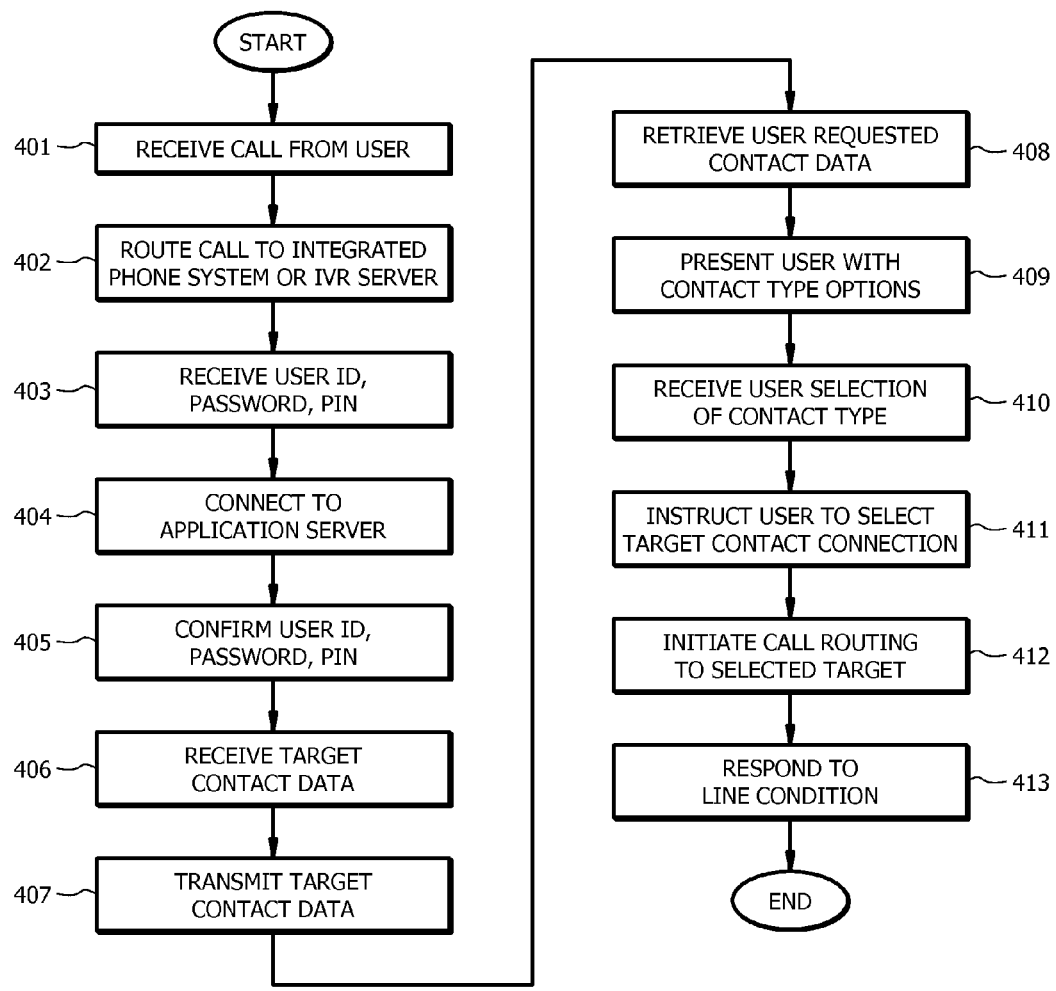
FIG. 4 illustrates a flow diagram representation of a phone-based contacts recovery process in accordance with an embodiment.

Referring now to FIG. 4, there is illustrated a diagrammatic representation of a phone-based contacts recovery process 400. In one embodiment, step 401 allows a user 420 to dial a designated toll free number from almost any telecommunication device, including payphones, analog phones, and VOIP telephones, utilizing a PSTN, the Internet, or any IP network 421, in order to access the contacts previously stored in the CIBR system and belonging to the user 420. In step 402, the toll free number or other means for contacting the CIBR system routes to a cloud service provider's integrated telephone system or interactive voice response (IVR) server 422. In step 403, The IVR server 422 may have an automatic attendant that answers the call, instructing the user 420 to enter, on a telephone keypad, a password or personal identification number (PIN) associated with the user 420. In step 404, the IVR server 422 connects to an application server 423 and passes the password or PIN keyed in by the user 420 to the application server 423. In step 405, the application server 423 connects to a database server 424 and confirms the password or PIN stored in a database 425.

In step 406, the IVR server 422 prompts the user 420 to enter, using a telephone keypad (or communication device user interface), the first letters of the last name of a target contact 426. "Target contact" refers to the contact information the user wishes to retrieve. In step 407, the IVR server 422 passes the first letters of the last name of the target contact 426 to the application server 423 and to the database server 424 to retrieve the records of the target contact 426. In step 408, the database server 424 retrieves the user requested contact numbers based on the characters entered on the mobile communication device by the user 420 and passes the user requested contact numbers to the application server 423 and onto the IVR server 422. In step 409, the IVR server 422 digitally pronounces the name of the target contact 426 and prompts the user 420 to select a contact type (e.g., mobile, business, home, or another contact type) to pinpoint a single contact in the database 425. In step 410 the user 420 selects the contact type. At step 411, the IVR server 422 instructss the user 420 to press a specific number or character on the wired or wireless communication device keypad or user interface to be connected to the selected target contact 426, or a different specific number or character to have the contact number spoken by the IVR announcer.

In step 412, if the user 420 selects to be connected to the target contact 426, the IVR server 422 is configured to initiate an automated routing transfer to perform an outbound call through the network 421. The automated routing transfer may utilize the IVR server 422 in handling the call, rather than utilizing the phone device with which the user 420 made the initial call to the IVR server 422. In step 411, the IVR server 422 uses call progress detection to recognize different line conditions. If the line condition is "answered," the IVR server 422 may tell the target contact 426 that the user 420 is calling and ask the target contact 426 to wait for the user 420. If the line condition is "answered by voice mail or answering machine," the IVR server 422 may allow the user 420 to leave a message. If the line condition is "fax tone" or "no answer," the IVR server 422 may prompt the user 420 for another target contact 426.

Figure 5:
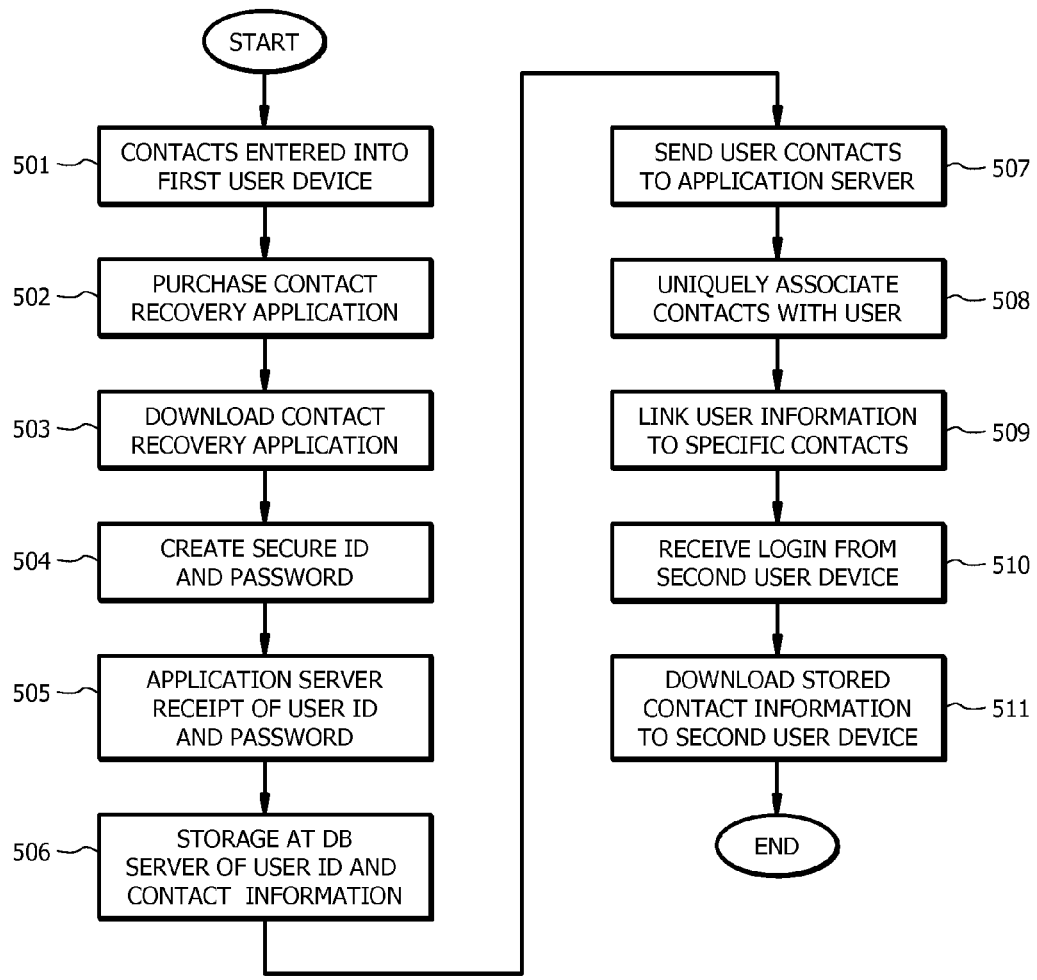
FIG. 5 illustrates a flow diagram representation of a client-side application-based contacts backup and recovery process in accordance with an embodiment.

Referring now to FIG. 5, there is illustrated a diagrammatic representation of a client-side-application-based contacts backup and recovery process 500. In step 501, a user 420 enters contacts information into a smartphone 521. In step 502, the user 420 decides to purchase or receive a free version of a client-side application from an online application store. In step 503, the client-side application is purchased or acquired and downloaded from the application store servers 522. In step 504, the client-side application communicates with a web server 523 and instructs the user 420 on creating a secure user ID and password. In step 505, the web server 523 passes the user ID and password to an application server 524 for editing, validating, and accessing a database 526. In step 506, the application server 524 passes data, such as the user ID, password, and contacts information, to a database server 525 for storage or retrieval of the data.

In step 507, once the user ID is created and stored on the database server 525, the client-side application reads the contacts stored on the smartphone 521 and is configured to send the contacts to the application server 524 for processing. Step 508 illustrates that the user ID is stored on each contact record 527, uniquely identifying which contact entries belong to which users. The user ID and password only allow access to specific contact records 527 in the database 526. Step 509 illustrates the link between the user ID and password to specific contacts associated with the user ID and password. The link is executed by programs running on the application server 524 and the database server 525. If the user 420 loses the smartphone 521 or acquires a new mobile communication device, at step 510 the user 420 may re-download the client-side application from the online app store, login with the previous user ID and password. Next, at step 511 the user may download to a new device the contacts associated with the user 420 stored in the database 526. In another embodiment, the user 420 may use a web-based interface via a web browser to login with the previous user ID and password and download the contacts associated with the user 420 stored in the database 526.

Figure 6:
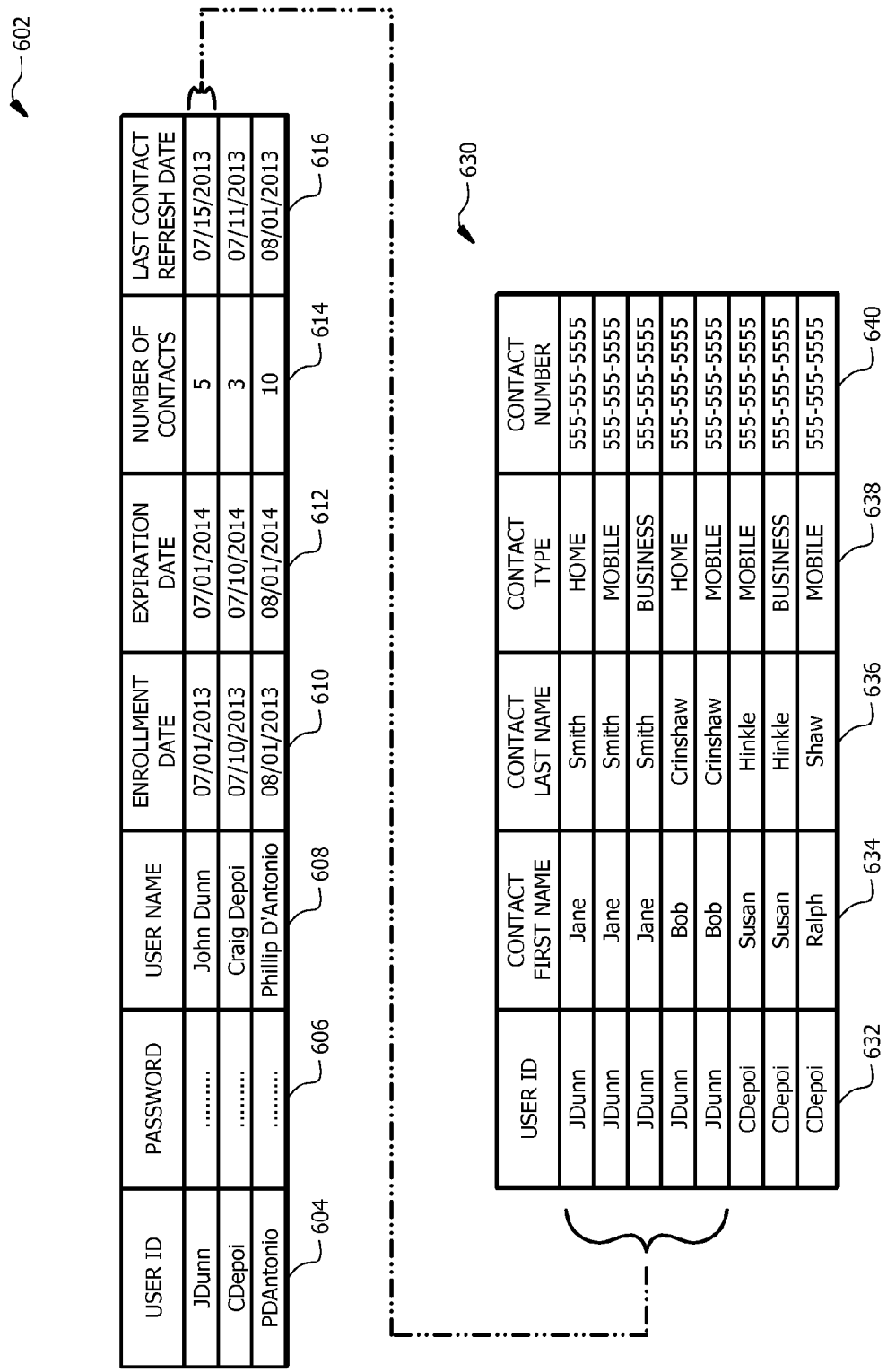
FIG. 6 illustrates a user account information table and a user contact table according to an embodiment.

FIG. 6 depicts user account information table 602 and user contacts table 630 reflecting storage of such information in a storage medium such as the described contacts data store 80. User account information table 602 is populated with data associated with an enrolled user of the described CIBR system. Through enrollment operations between a user wishing to make contacts available for later retrieval and the CIBR system coordinated by the subscriber manager 60, user account information table 602 is populated with a user ID 604, a user password 606, a user name 608, a user enrollment date 610, a user participation expiration date 612, the number of contacts associated with the user 614 and the data on which contacts were last refreshed 616. Together the user ID 604 and password 606 are unique to a single user account. That is, no two users may have the same user ID and password. Once a user account is established and contacts associated with the user are stored to the contacts data store 80, number of contacts column 614 is populated. User participation expiration date 612 contemplates a term of enrollment which may be monthly, yearly or tied to any particular payment cycle or otherwise. The last contact refresh column 616 updates each time a user either updates an existing contact or adds another contact to the user's collection of contacts.

Once the user is enrolled and contacts associated with that user are uploaded to the CIBR system, the contacts are stored in the contacts data store 80 and arranged such as shown in user contact table 630. User contact table 630 includes a user ID column that corresponds to the user ID column of user account information table 602. In user contact table 630, the user ID is entered in user ID field 632 for each contact of that user. User contact table 630 also includes a contact first name entries 634, contact last name entries 636, contact type entries 638 and contact numbers 640. In contact table 630, contact number 555-555-5555 occupying contact number field 640 is illustrative only as in operation various multi-digit numbers corresponding to various user's actual contact numbers will occupy field 640. Each enrolled user's contacts are arranged in this manner for ease of retrieval. As described above with respect to FIG. 4, the identifiers stored in the contact type field 638 enable the CIBR system to discern which of several contact numbers are to be provided to the requesting user. The data stored in the contacts data store 80 for a user and the user account data are uniquely linked according to the combination of the user ID 604 and password 606.

As shown, five contacts are stored in user contact table 630 for the user having user ID "JDunn". Through the contact retrieval process described above, once the user enters the first three letters of the contact's last name, for example "Smi" for Jane Smith, the CIBR system will recognize that there are multiple contacts for Jane Smith. Specifically, in the user contacts table 630 there are home, mobile and business contact numbers for Jane Smith, although the business and mobile numbers are the same. In the case of multiple contact numbers for a single contact, the user is prompted to enter a contact type, by example by depressing a "1" on a smartphone keypad for home, "2" for a mobile device, or "3" for business. In response to the contact type selection by the user, the CIBR system will provide the requesting user with the option of connecting the call to the appropriate contact number or delivering the contact number to the user, via a synthesized voice message, text message, email message, or the like.

In one embodiment, the client-side application allows a user to enter the user's email and password in order to login to the system. Tapping a login button on the mobile communication device's user interface and/or application's graphic user interface validates login credentials on a server. If the credentials are correct, the user is redirected to a home screen on the graphic user interface. If the user selects a "forgot password" link, the user is directed to a "recover password" screen where the user can recover the user's password by providing the user's email. A "register" link takes the user to a register screen. The register screen allows the user to enter the user's full name, mobile number, email, and password. Pressing a submit button processes registration on the server. After successful registration, the user is taken to the home screen. Tapping on cancel from the register screen takes the user back to the login screen.

In various embodiments, on the home screen, the user can select a backup button or a restore button. The home screen also may include a "plan" link that takes the user to a screen that allows the user to see the user's current plan and/or to subscribe to other plans. If the user selects the backup button from the home screen, the user is taken to a backup screen. On the backup screen, the user is shown the total number of contacts that one can upload according to the user's current subscription plan. The backup screen also shows the user the current number of used contacts out of the total allowed under the user's current subscription plan. The backup screen also has a backup button, which allows the user to start a backup operation. Selecting the backup button may allow the user to stay on the backup screen. During the backup operation, the user may be shown the total number of contacts that one can upload according to the user's present subscription plan, as well as the current number of contacts already uploaded. A slider shows the current number of contacts synced with the server. Additionally, during the backup operation, a cancel button may be selected to cancel the backup operation.

If the user selects the plan link from the home screen, the user is directed to a plans screen. The plans screen shows the user's current plan with a green check mark. The plan screen also shows the user other available plans. The user can select any of the available plans and pay for a new plan using a specific pay button, such as a PayPal button. If the user selects the restore button from the home screen, the user is directed to a restore screen to initiate a contacts restoration operation.

In operation of one embodiment, a user dials a designated "1-800" number to access his or her contacts. The 1-800 number routes to a cloud service provider's Integrated Telephone System/Interactive Voice Response (IVR) Server. The IVR Server automatic attendant answers the call instructing the user to enter the user's password/PIN on the device keypad. The IVR Server connects to the Application Server and passes the password/PIN keyed in by the user. The Application Server then connects to the Database Server and confirms the user's password/PIN stored in the database. The IVR Server, using pre-scripted menus, prompts the user to enter the first letters of the last name of the contact, using the device keypad. The IVR server passes the first letters of the contact's last name to the Application and Database Servers to retrieve the contact records with that last name. The Database Server then retrieves the user requested contact numbers based on the characters entered by the user and passes the information to the Application Server and then onto the IVR Server. The IVR server then causes digital pronunciation of the contact name and prompts the user to select the contact type (such as mobile, business or home) to pinpoint a single contact in the database. Once the user selects the contact type, the IVR Server gives the user the option of being connected to the contact number or being provided with the number. If the user selects connection, then the IVR Server initiates the outbound call. The IVR Server then uses call progress detection functionality to recognize different line conditions, such as answered, at which time the IVR Server informs the contact who is calling and askes the contact to wait for the user; answering by voicemail, at which time the user is allowed to leave a message; a fax tone, at which time the user is prompted to select another contact; or no answer, at which time the user will be prompted to select another contact.

In operation of an embodiment, a user accesses the disclosed CIBR system may be accessed by a user via an application downloaded to a handheld device such as a smartphone. Once a user enters his or her contacts on a smartphone, a user may purchase a CIBR application from a source such as an AppStore. The application is purchased from the AppStore and downloaded to the smartphone. The application communicates via a specific domain name (associated with a specific IP address) to a secured web server and instructs the user on creating a secure User ID and password. The web server passes the User ID and password to the Application Server for editing and validating and accessing the database. The Application Server then passes validated data (User ID, password and contacts) to the database server for storage and retrieval. Once the User ID is created and stored on the database server, the smartphone application reads the contacts stored on the device and sends them to the Application Server for processing. The User ID is stored on each contact record, uniquely identifying which contact entries belong to which user (as illustrated in FIG. 6). The User ID and password only allow access to specific contact in the database. The User ID of a user and password are linked to that user's contacts by programs running on the Application and Database Servers. If the user loses or replaces the smartphone, the application may be reloaded to the new device and the user may login with the pre-existing User ID and password. The user may then download his or her contacts stored in the database to the new device.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention References throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, HD, memory), hardware circuitry or the like, or any combination thereof. Within this disclosure, the term "computer readable medium" or is not limited to ROM, RAM, and HD and can include any type of data storage medium memory that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in a combination of software and hardware. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

What is claimed is:

1. A system for contact information backup and recovery comprising:
   a contact information backup and recovery system, operatively coupled to a communications network, comprising:
   a backup manager for receiving a remotely stored contact information;
   a recovery manager for recovering the remotely stored contact information;
   a subscriber manager for managing subscriber information;
   an interactive user module;
   a database server; and
   a contacts data store, comprising a contacts database, operatively coupled to the contact information backup and recovery system, for storing contact information sourced to an unavailable first telephony device and remote from the unavailable first telephony device received by the backup manager, and for accessing, by a second telephony device via the recovery manager, the contact information, wherein the recovery manager receives a telephonic call to access contact information from the second telephony device remote from the unavailable first telephony device to which the contact information is sourced, wherein the database server receives the input data from the interactive user module for retrieval of a contact record associated with input data indicative of the contact information, wherein the interactive user module prompts selection via the second telephony device of a contact type according to the retrieved contact record, and wherein in response to the selection of the contact type the interactive user module selects a contact record entry and initiates a telephonic call to a third telephony device identified by the contact record entry and transmits an indicator to the third telephony device that the call originated from the unavailable first telephony device.

2. The system of claim 1, wherein the interactive user module receives input data from the second telephony device indicative of the contact information sourced to the unavailable first telephony device.

3. The system of claim 1, wherein in response to the selection of the contact type the interactive user module selects a contact record entry and communicates the contact record entry identifier to the second telephony device.

4. The system of claim 1, wherein the telephonic call is initiated through a call initiating device selected from a group consisting of a voice activation sensor, a motion detection sensor, and a biometric characteristic sensor.

* * * * *